United States Patent
Nedzlek et al.

(10) Patent No.: US 9,586,274 B2
(45) Date of Patent: Mar. 7, 2017

(54) CUBIC CUTTING INSERT FOR BORING OR PLUNGING

(75) Inventors: Kevin Nedzlek, Jefferson, WI (US); Kenneth Baertson, Commerce Township, MI (US)

(73) Assignee: Walter AG, Tübingen (DE)

( * ) Notice: Subject to any disclaimer, the term of this patent is extended or adjusted under 35 U.S.C. 154(b) by 252 days.

(21) Appl. No.: 14/122,709

(22) PCT Filed: Jun. 14, 2012

(86) PCT No.: PCT/EP2012/061380
§ 371 (c)(1),
(2), (4) Date: Jan. 31, 2014

(87) PCT Pub. No.: WO2013/000729
PCT Pub. Date: Jan. 3, 2013

(65) Prior Publication Data
US 2014/0186128 A1    Jul. 3, 2014

Related U.S. Application Data (60) Provisional application No. 61/501,396, filed on Jun. 27, 2011.

(51) Int. Cl.
*B23B 27/16* (2006.01)
*B23C 5/24* (2006.01)
(Continued)

(52) U.S. Cl.
CPC ............ *B23C 5/24* (2013.01); *B23B 27/1611* (2013.01); *B23C 3/05* (2013.01); *B23C 3/055* (2013.01);
(Continued)

(58) Field of Classification Search
CPC .......... B23B 2200/164; B23B 27/1611; B23B 2200/3681; B23C 2200/286; B23C 2200/367; B23C 5/207
See application file for complete search history.

(56) References Cited

U.S. PATENT DOCUMENTS 381,374 A * 4/1888 Hine ...................... B01D 45/08
                                                        55/464
3,142,110 A * 7/1964 Hertel ..................... B23B 27/16
                                                        407/109
(Continued)

FOREIGN PATENT DOCUMENTS

| JP | 8-39328 | 2/1996 |
|----|---------|--------|
| JP | 2007-69268 | 3/2007 |

OTHER PUBLICATIONS

International Preliminary Report on Patentability for Application No. PCT/EP2012/061380 mailed Jan. 16, 2014.

*Primary Examiner* — Sara Addisu
(74) *Attorney, Agent, or Firm* — Morgan, Lewis & Bockius LLP (57) ABSTRACT

Cutting insert with a cuboid body has a substantially square top face and bottom face, said top face and bottom face connected by four peripheral adjoining side surfaces. At least two cutting edges are formed at the transition of the top face to at least two side surfaces, that cutting edges defining a plane of the top face. To provide a cutting insert and a corresponding tool suited to produce valve seat surfaces with high precision but still having a rather simple construction and being precisely mountable with ease and less efforts of adjustment, the plane defined by the top face cutting edges of the cutting insert has maximum dimensions of 7 mm×7 mm, where the bottom face has a supporting surface (Continued)

formed exactly parallel to the plane defined by the top face cutting edges by means of grinding within a tolerance of less than 5 angular minutes.

18 Claims, 8 Drawing Sheets

(51) Int. Cl.
    *B23C 3/05*           (2006.01)
    *B23C 5/20*           (2006.01)

(52) U.S. Cl.
    CPC ............ *B23C 5/207* (2013.01); *B23C 5/2427* (2013.01); *B23C 5/2472* (2013.01); *B23C 5/2489* (2013.01); *B23B 2200/164* (2013.01); *B23B 2200/3681* (2013.01); *B23B 2260/022* (2013.01); *B23C 2200/125* (2013.01); *B23C 2200/164* (2013.01); *B23C 2200/286* (2013.01); *B23C 2200/367* (2013.01); *B23C 2226/125* (2013.01); *B23C 2240/08* (2013.01); *Y10T 407/1906* (2015.01); *Y10T 407/1928* (2015.01); *Y10T 407/23* (2015.01)

(56) References Cited

U.S. PATENT DOCUMENTS

| | | | | |
|---|---|---|---|---|
| 3,421,196 A * | 1/1969 | Reich | ............... | B23B 27/145 407/113 |
| 3,490,117 A * | 1/1970 | Hertel | ............ | B23B 27/1614 407/101 |
| 4,425,063 A * | 1/1984 | Striegl | ............... | B23D 77/04 407/113 |
| 4,531,864 A * | 7/1985 | Bylund | ............... | B23C 5/109 407/114 |
| 4,573,831 A * | 3/1986 | Lacey | ............... | B23C 5/2213 407/114 |
| 4,729,697 A * | 3/1988 | Lacey | ............... | B23C 5/2213 407/114 |
| 5,382,118 A * | 1/1995 | Satran | ................. | B23C 5/06 407/113 |
| 5,477,754 A * | 12/1995 | Herbon | ............. | B23B 27/141 407/113 |
| 5,967,706 A * | 10/1999 | Hughes, Jr. | ............ | B23C 5/109 407/41 |
| 6,007,766 A | 12/1999 | Roman | | |
| 6,164,878 A * | 12/2000 | Satran | ............... | B23C 5/2221 407/102 |
| 6,722,823 B1 * | 4/2004 | de Souza | ............ | B23C 5/006 407/113 |
| 6,974,280 B2 * | 12/2005 | Satran | ................. | B23C 5/08 407/113 |
| 7,252,460 B2 * | 8/2007 | Rieth | ................ | B23C 5/2213 407/113 |
| 7,549,824 B2 * | 6/2009 | Agic | ................. | B23B 27/16 407/113 |
| 7,713,005 B2 * | 5/2010 | Rieth | ................ | B23C 3/126 407/113 |
| 9,144,848 B2 * | 9/2015 | Konta | ................ | B23C 5/109 |
| 2006/0269366 A1 | 11/2006 | Rieth | | |
| 2009/0080984 A1 | 3/2009 | Lehmann et al. | | |
| 2013/0022417 A1 * | 1/2013 | Gesell | ................ | B23C 5/207 407/113 |
| 2013/0156515 A1 * | 6/2013 | Satran | ................ | B23C 5/207 407/48 |
| 2013/0302099 A1 * | 11/2013 | Choi | ................ | B23C 5/08 407/113 |
| 2015/0343535 A1 * | 12/2015 | Sakamoto | ........... | C23C 14/0635 407/115 |

* cited by examiner

CUBIC CUTTING INSERT FOR BORING OR PLUNGING

The present invention is related to a cutting insert comprising a cuboid body having a substantially square top face and a bottom face, the top face and the bottom face being connected by means of four peripheral contiguous side surfaces, wherein at least two cutting edges are formed at the transition from the top face to at least two of said side surfaces, said cutting edges defining a plane of said top face.

Corresponding cutting inserts are well known in the art as simple prismatic blocks but may also be provided in numerous other embodiments, such as in truncated pyramid shape and/or with structured surfaces as so-called positive or as negative cutting inserts (meaning that the wedge angle at the cutting edge is either smaller than 90° or ≥90°, respectively).

While the technique of producing corresponding cemented carbide inserts, by means of pressing and sintering, wherein the green bodies may alternatively also be produced by injection molding, is already an advanced technique so that the cutting inserts can be produced precisely and reproducibly, there are still some fields of use in which the preciseness of common cutting inserts as finally prepared by form pressing and sintering are definitely not sufficient. Therefore, supporting or stop surfaces and surfaces adjoining the cutting edge are still ground in some cases. As an alternative or in addition, adjustment means may be provided at a corresponding seat of a tool receiving said cutting insert.

Such cases of application are for instance tools having cutting inserts for the production of (generally conical) valve seats. In case such valve seats are produced by means of a rotatable tool having said cutting inserts arranged at the front face or peripheral side thereof, rather cumbersome adjusting mechanisms are required with such a tool and in case there are several cutting inserts provided, each of the individual cutting inserts is to be precisely oriented and adjusted such that the active cutting edges thereof are all arranged on the same conical surface having the shape of the valve seat surface to be produced by means of such tool and cutting inserts.

For that purpose, there are provided tools having peripheral slots axially extending towards the front face of the tool, wherein corresponding blades are inserted within said slots being adjustable along the axial and radial direction and also with respect to their angular orientation with regard to the axis of the tool in order to precisely align the corresponding cutting edge. In order to improve the stability and smooth and steady rotation of such a tool, there are provided at least three corresponding cutting edges at about the same angular distances (about 120° in case of three cutting edges) with respect to each other, in order to provide a high precision of concentricity. For a tight abutment of a valve head onto a generally conical valve seat it is important that the valve seat comprises a well-defined conical surface. For that purpose, the inclination angle of the cutting edges generating the conical surface and measured with respect to the axis of the tool must be exactly the same for all cutting edges provided therefor at the tool.

The prior art tools of this type therefore comprise cumbersome adjustment mechanisms allowing an independent adjustment of the axial position, the radial position and the inclination angle of the cutting edge with respect to the tool and the tool axis, respectively.

In view of the above prior art, the present invention is dealing with the object, to provide a cutting insert and a corresponding tool which is suited to produce valve seat surfaces with high precision but still have a rather simple construction and are precisely mountable with ease and with less efforts of adjustment. Preferably, the cutting insert should also have a long effective lifetime.

Regarding the cutting insert as such, the corresponding object is achieved by a cutting insert as defined above, which is characterized in that the top face including the associated cutting edges has maximum dimensions of 7 mm*7 mm, wherein the bottom face comprises a supporting surface which is prepared by means of grinding exactly parallel to the plane defined by the cutting edges of the upper surface within a tolerance threshold of 5 angular minutes.

The corresponding tool is a rotatable tool for the generation of rotational symmetrical surfaces, having a shaft to be rotatably mounted about an axis thereof and a tool head comprising at least one recess for an indexable cutting insert, the base surface of which is provided for supporting a face of a cutting insert as defined above, and which base surface is oriented at an angle between 5° and 90° with respect to said axis.

With respect to such a tool, the object underlying the present invention is achieved in that the base surface of said recess, which is provided for the support of a corresponding non-active of the top or bottom faces of said cutting insert, is ground to a particular angle between 5° and 90° relative to said axis within a tolerance limit of at most 5 angular minutes.

This means, that both, said tool and also said cutting inserts are each provided with precisely ground surfaces provided for abutment with each other, so that a corresponding cutting edge provided on the side opposite of the respective supporting surface of said insert, is oriented and adjusted in a correspondingly precise manner. Therefore, cumbersome means for adjustment of the cutting edges may be dispensed with by such a tool or can at least be simplified, assuming, that the conical angle of a surface to be produced by means of such a tool substantially corresponds to the angle at which the base surface of said slot is ground with respect to the axis of said tool. This angle is to be measured in a plane including the tool axis and extending perpendicular to one of the edge(s) or edge lines of the base surface Due to the ground top and bottom surfaces of the cutting insert, The cutting edges will have a well defined position and orientation with respect to the bottom face and thus also with respect to the base surface of the slot, which is supporting the bottom face of the cutting insert. Further, the cutting insert is sufficiently small, that is the upper face and/or the lower face thereof are comprising maximum dimensions of 7 mm*7 mm, preferably even smaller than 6 mm×6 mm, such that also the respective cutting edges will have a maximum length of 7 mm or less so that any possibly remaining inaccuracies of the afore-mentioned ground surfaces (within the above tolerance limits) will not have any detrimental effect on the surfaces generated by said cutting edges and the orientation and position of the cutting edges. Of course, the slot is designed for accommodating an insert in a well fitted manner, i. e. the width of the slot slightly exceeds the width of the cutting insert.

The tool has in general several recesses or seats for a corresponding number of cutting inserts, the active cutting edges of which all being oriented exactly under the same angle of inclination with respect to the axis of the tool as the ground base surface so that the active cutting edges are arranged on and are defining a conical surface, which may be a common conical surface, as far as also the axial and radial position thereof is correctly adjusted and if the angle of inclination of all base surfaces is the same. The base surfaces of the seats of said tool, i. e the base surfaces of the straight slots extending through a portion of the tool head offset from the axis, are straight plane surfaces having an angle of inclination with respect to the axis, which may be the same, so that all of the three cutting edges are arranged on the same conical surface and this conical surface is also generated by the cutting edges, provided that also the axial and radial adjustment is the same for the three inserts. The lateral edges of the slot, in particular the lateral edges of the base surfaces thereof are intersecting a particular axial plane (i. e. including the axis) at a right angle, defining the plane in which the above mentioned angle of inclination is to be measured. The cutting edges of the finally mounted cutting inserts may be arranged exactly in the same axial plane, however, they may as well be shifted parallel along the base surface away from this axial plane by a small amount. In the latter case, the effective radius and angle of the conical surface generated by the cutting edges may be slightly changed, however, as long as all cutting inserts are shifted by the same amount and in the same direction with respect to the corresponding plane including the axis, they still define and generate a common conical surface.

In general, however, the cone angele for each cutting insert and thus for each base surface of the slots will be different for different slots, which means that each cutting insert is cutting a different conical surface at a well defined radial and axial position, so the a corresponding valve seat generated by such tool may be comprised of a plurality of adjoining conical surfaces having different cone angles. Typically, the larger of these cone angles will be associated with a larger radius than the smaller ones.

Further, the plane base surfaces of the grooves are tilted about a relief angle with respect to a tangential plane inclined to the tool axis by the same angle as the base surface and extending perpendicular to the above defined axial plane which extends perpendicular to an edge of the base surface. Said plane is called a "tangential plane" because it would be tangential to a conical surface generated by the cutting edges when rotating about the tool axis, or at least parallel to such a tangential plane touching the conical surface along a line thereof, which is arranged within said axial plane, i. e. defined by the intersection of the tangential plane and the axial plane.

It is thus possible to mount a corresponding cutting insert directly and with only little further adjustment (in particular with regard to axial and/or radial adjustment) on a corresponding tool in order to produce therewith highly precise, rotationally symmetrical surfaces such as for instance the valve seats on automobile motors. The remaining option of adjustment may be an adjustment perpendicular to the base surface and may for instance be provided in that an adjustment shim having mutually parallel, plane surfaces is arranged between the cutting insert and the base surface, said adjustment shim comprising a free edge which is supported by the base surface and extends parallel with respect to said plane including the axis and extending perpendicular to the edge of the base surface. In case this adjusting shim having mutually parallel, plane surfaces is raised from the base surface on one end thereof, the angular orientation of the cutting edge and thus the corresponding angle of the conical surface on which a cutting edge of a cutting insert is arranged when supported by the adjustment shim, will not be changed but instead said cutting edge is merely shifted along the axial and radial direction, i. e. away from the base surface in a direction perpendicular thereto, in order to be arranged on the same conical surface as defined by the corresponding cutting edges of the remaining cutting inserts provided that a corresponding shift is required therefor. An adjustment means provided for such a purpose may be constructed in a comparably simple manner and is easy to operate.

Since the corresponding valve seats surfaces only have a rather small axial extension or small extension perpendicular to the peripheral direction, the small size of the cutting inserts according to the present invention is still sufficient in order to be able to produce corresponding valve seats surfaces without further adjustments.

Particular designs of embodiments of the present invention may further improve the economic use of corresponding cutting inserts.

As an example, there is provided an embodiment of a cutting insert according to the present invention, wherein the top face and the bottom face of said cutting insert are mirrored and/or identical with respect to each other, wherein cutting edges are also formed between the respective side surfaces and the bottom face. With such an embodiment, the total number of available cutting edges may for instance be raised to 8 cutting edges per cutting insert so that by a simple indexing and/or turning of the cutting insert within its seat, up to seven fresh cutting edges can be presented as an active cutting edge one after another after a preceding cutting edge has been worn out, wherein the new cutting edge is precisely oriented and arranged in the same way as the cutting edge before. This results in an effective extension of the life time of the cutting insert.

Moreover, it may be advantageous if according to another embodiment of a corresponding cutting insert the cutting edges of the upper face and the cutting edges of the lower face are defining the shape of an imaginary cube within a tolerance threshold of 5%. As defined for a preferred embodiment before, the top face and the bottom face are square in any way so that the formation of the shape of an imaginary cube just means that also the distance between the top face and the bottom face corresponds to the length of an edge of said top face and/or bottom face, in particular with a maximum deviation of +/−5%.

Further, since the cutting insert is rather small anyway, the cubic formation, in contrast to shim shaped cutting inserts, results in sufficiently large side surfaces in order to engage these surfaces by corresponding clamping means for securing it safely and precisely on the respective tool and keep the cutting insert as such relatively stable and rigid.

The top- and bottom face are formed as continuously plane surfaces in one embodiment.

In another embodiment, there may be a central portion of the top face and/or the bottom face having a distance of at least 0.5 mm with respect to the associated (surrounding) adjacent cutting edges and which central portion is provided as a supporting surface for the cutting edges defining the parallel plane on the opposite side, wherein said supporting surface may be projecting or recessed with respect to the plane defined by the cutting edges on the same side. Of course, this also requires that the corresponding supporting surface on the tool is produced in a corresponding manner and may have to be smaller than the total surface of the top face and bottom face, so that the actual support only occurs within the said central portion. In this case, it is not necessarily required that the central portion is exactly within the same plane as the adjacent cutting edges, however, this portion still must be parallel to the plane defined by the cutting edges on the opposite side.

A slightly recessed supporting surface may be preferred in some cases, because the supporting surface may become part of the relief surface in the position where the adjacent cutting edges are active cutting edges and a correspondingly recessed supporting- or relief surface will definitely avoid any contact with the work piece in the active position of an adjacent cutting edge. However, since the cutting inserts will be arranged on a corresponding tool in a slightly tilted manner in order to provide sufficient relief angle between the respective top face and the surface of the work piece generated by the leading cutting edge, a corresponding supporting surface might even be somewhat projecting beyond the plane of the cutting edges as long as any contact of the surface of the work piece with the relief surface adjacent the active cutting edges may be avoided.

In a particular embodiment of the present invention, there is provided that the side surfaces are recessed or waisted, in that the portions adjoining the top face and the bottom face, respectively, are forming an angle of less than 90° therewith. This renders the cutting edges to be positive cutting edges which may reduce the cutting forces.

Further, with such an embodiment there may be provided a cross section of said cutting insert parallel to the top face and the bottom face, respectively, having a smallest value in an intermediate central plane between the top face and the bottom face and continuously decreases when starting from each of the top face and/or bottom face and going towards said intermediate plane. A corresponding cutting insert appears as a waisted cube and may have four positive cutting edges on each of said top face and bottom face, respectively.

Further, there is assumed and preferred that the cutting insert is symmetrical with respect to any rotation by 90° about an axis extending centrally and perpendicularly with respect to the top face and bottom face, respectively. The cutting insert of a further preferred embodiment is in addition mirror symmetrical with respect to an intermediate central plane parallel to the top and bottom faces, respectively The body of the cutting insert is preferably comprised of a hard metal (cemented carbide) and may further comprise a coating or layer of CBN on both, the top and the bottom face thereof. CBN (cubit boron nitride) is well-known as a particularly hard and resistant material.

As already mentioned, the thickness of the cutting insert as defined by the distance between the top face and the bottom face, should fall within a range of at least 95% and at most 105% of the length of a cutting edge which in turn defines the length of an imaginary edge of a cube and a corresponding square top- and bottom face, respectively.

It is further preferred to have four cutting edges on each of the four sides of the square of the top- and the bottom face, respectively, which in total yields 8 available cutting edges increasing the total effective lifetime of the cutting insert by a factor of 8, when compared to a cutting insert having a single cutting edge, before any regrinding may become necessary. However, regrinding of the present cutting insert is not considered as the provision of up to eight cutting edges on a single insert is considered to compensate for any possible regrinding and it would be difficult to reproduce exactly the same conical seat surfaces with a reground cutting insert.

With a corresponding tool having an axis of rotation, several seats are provided for receiving corresponding cutting inserts and the base surfaces of each of said seats of this tool are ground to the same angle with respect to the axis. These base surfaces should define a common conical surface according to an embodiment of the present invention, which in turn results in the effect, that also the active cutting edges of a cutting insert supported by said base surface will also be on a common conical surface which may correspond to a valve seat surface being produced by means of said tool.

Further advantages, features and applications of the present invention will become apparent on basis of the following description of a preferred embodiment and the respective figures, in which:

FIG. 5a shows a rotatable tool for the production of valve seats having recesses for receiving a cutting insert according to the present invention, FIGS. 5b and 5c details of the tool of FIG. 5 on enlarged scale FIG. 6a an adjusting shim or anvil for adjusting a support surface FIG. 6b a perspective view of an adjustment and fixing mechanism including said adjusting shim, FIG. 6c the effect of operating the adjustment mechanism, FIGS. 7a and b: two sketches for illustration of the spatial orientation of the plane base surface of a slot within a tool head As may be seen from FIGS. 1 and 2, respectively, the cutting insert according to the present invention is a double sided indexable insert 1 having a square top face 2 and a square bottom face 3, which are connected by four peripheral side surfaces 4. Cutting edges 5 are formed on each of the transitions from the top face to each of the side surfaces as well as at the transition from the bottom face 3 to each of the side surfaces 4.

Figures 1, 2:
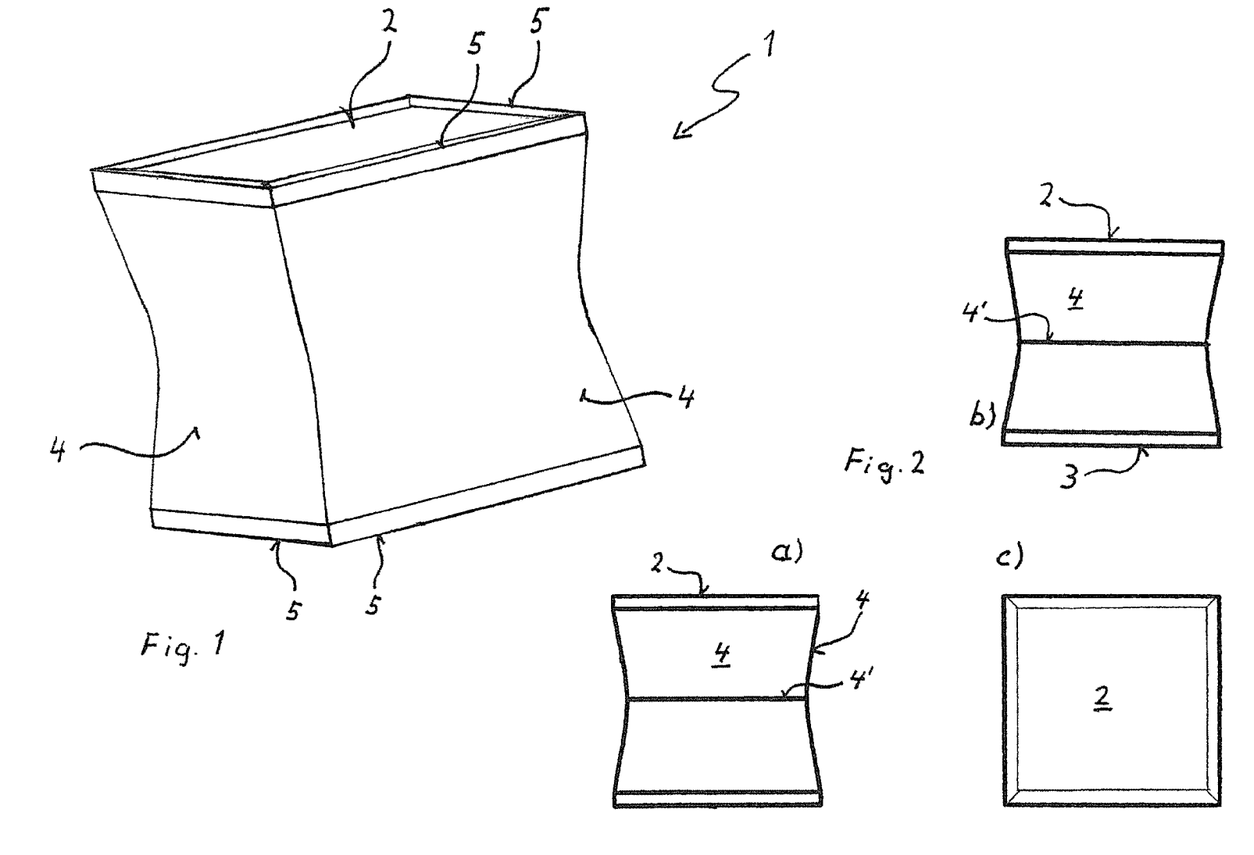
FIG. 1 shows a cutting insert according to the present invention in a perspective view.
FIG. 2 shows a side view and a top view onto the top and/or bottom surface of a corresponding cutting insert.

The top and bottom faces are mirror images of each other and the distance between the top face 2 and the bottom face 3 just corresponds to the length of each of the sides of these square surfaces so that the cutting edges formed at the transitions to the side surfaces are in total spanning the outline of a cube.

In the embodiment shown, the side surfaces 4 are somewhat waisted in the middle thereof, which means that the cross section when measured parallel to the top side and the bottom side, continuously decreases when starting from the top side or the bottom side towards an intermediate plane in the middle between the top side and the bottom side, which means that the cutting insert as a whole has a waisted appearance. The narrowest waist portion is indicated in FIG. 2 by a waist line 4'. However, such waisted structure is not an inevitable feature of the invention and the side surfaces 4 could as well be plane surfaces perpendicular to the top face 2 and the bottom face 3, so that the cutting insert as a whole would have the exact shape of a cube, while the height of such cube as defined by the distance between the top face 2 and the bottom face 3 may also deviate from the length of the square faces of the top face and the bottom face, respectively by some percent, which means, that the contour or shape of the cube does not exactly have to be provided. On the other hand, the square shape of the top and bottom faces is of more importance in order to provide for a correspondingly large number of identical cutting edges. In the embodiment shown, the cube has an edge length of about 5 mm, rendering the feature reasonable, that the thickness or height thereof is in the same order of magnitude in order to provide sufficient rigidity and stability of the insert.

The top face 2 and the bottom face 3 are both comprising a layer of CBN and the top face and the bottom face are ground exactly parallel to each other, so that any deviation of the orientation of these surfaces from the parallel orientation is less than 5 angular minutes.

The length of each edge of the top and bottom face is at most 7 mm and preferably less than 6 mm. In one embodiment, the length of such an edge is about 5 mm.

The corresponding cutting inserts may for instance be prepared by connecting two cutting inserts each having the shape of a truncated pyramid and having only half of the thickness of the final insert, wherein the smaller square surfaces of the truncated pyramids are soldered or brazed together. However, it is also possible to prepare the final shape directly by pressing in a mold, optionally followed by grinding. As already mentioned, the cutting inserts might as well have side surfaces extending perpendicular with respect to the top face and the bottom face.

Figures 3, 4:
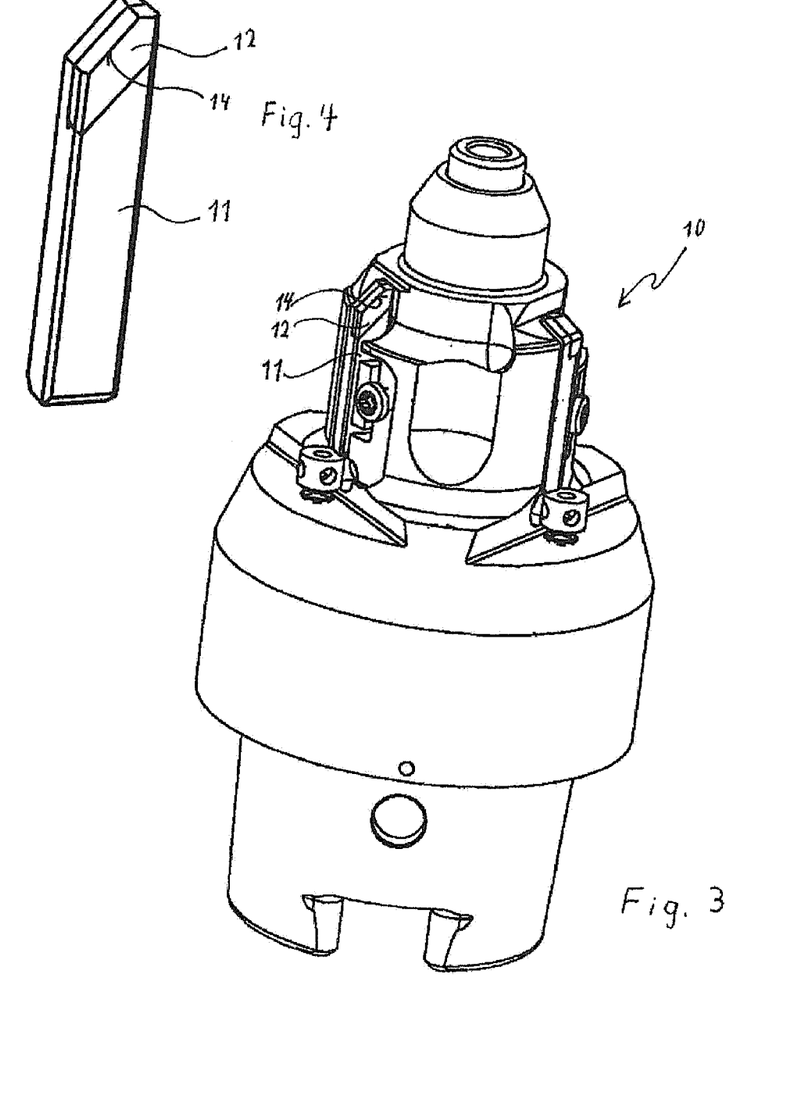
FIG. 3 shows a rotatable tool for production of valve seats according to the prior art.
FIG. 4 shows a corresponding prior art blade used for producing valve seats.

FIG. 3 shows a common rotatable tool 10 for the production of valve seats by means of cutting blades 11 having a cutting tip made of CBN (Cubic Boron Nitride). As can be seen, the cutting tip 12 is provided with a chamfer defining a cutting edge which becomes orientated by means of axial and radial adjustment of the blade on said tool body such that the cutting edge thereof is arranged on a conical surface in common with the cutting edges of further blades on the same tool head.

FIG. 4 shows a blade 11 according to the prior art for the tool shown in FIG. 3. The blade 11 includes a chamfered tip 12, which is coated by CBN and defines a cutting edge 14.

Figure 5A:
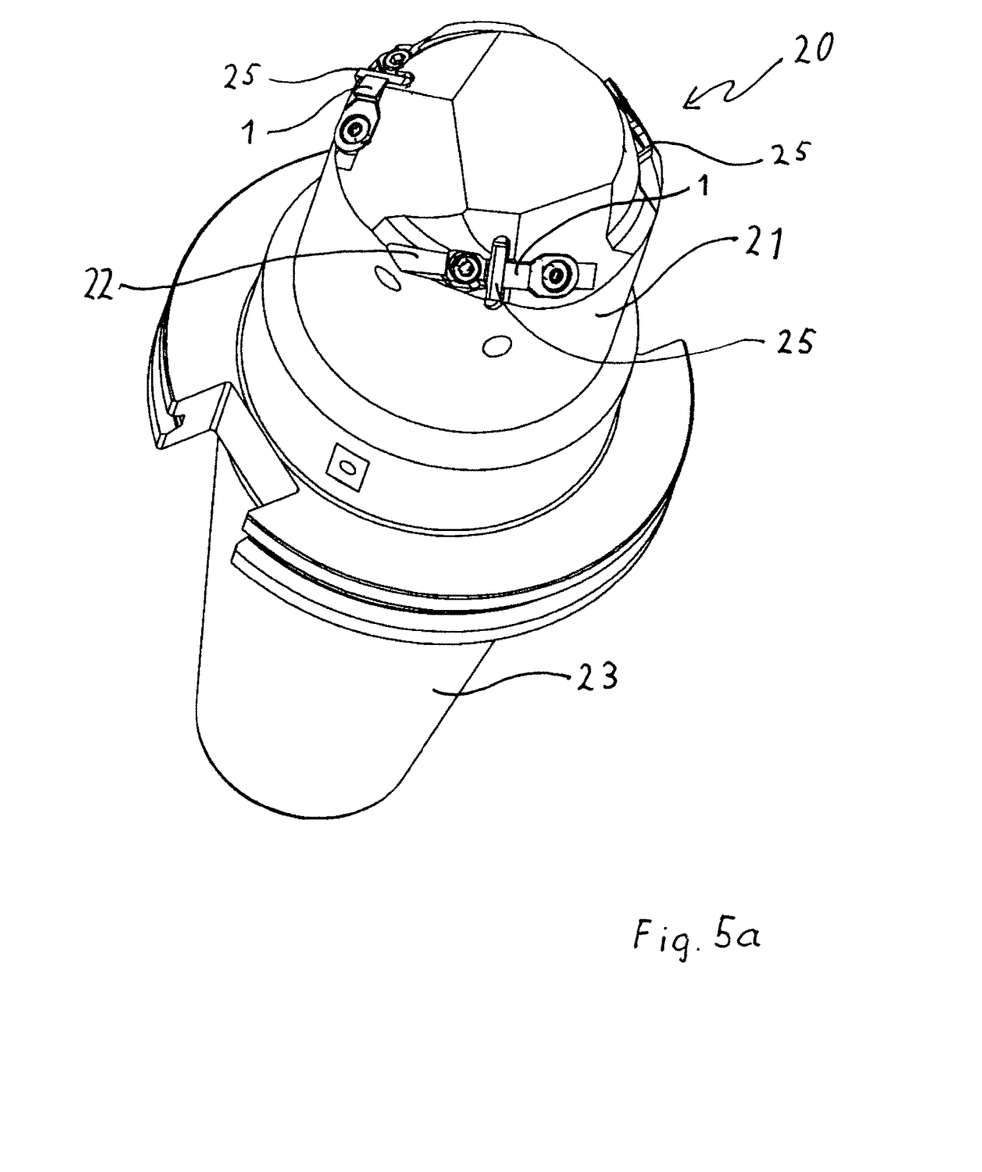

In contrast, FIG. 5a shows a tool according to the present invention. The tool is comprised of a shaft which can be rotatably mounted in a chuck and which has slanted slots provided in the partly conical front face thereof, wherein the bottom of the slots is ground and serves as a supporting surface for receiving the bottom face 3 or the top face 2 of corresponding cutting inserts. This may better be seen in FIGS. 5b and 5c, in which the tool head 21 is shown on a further enlarged scale.

Figure 7A:
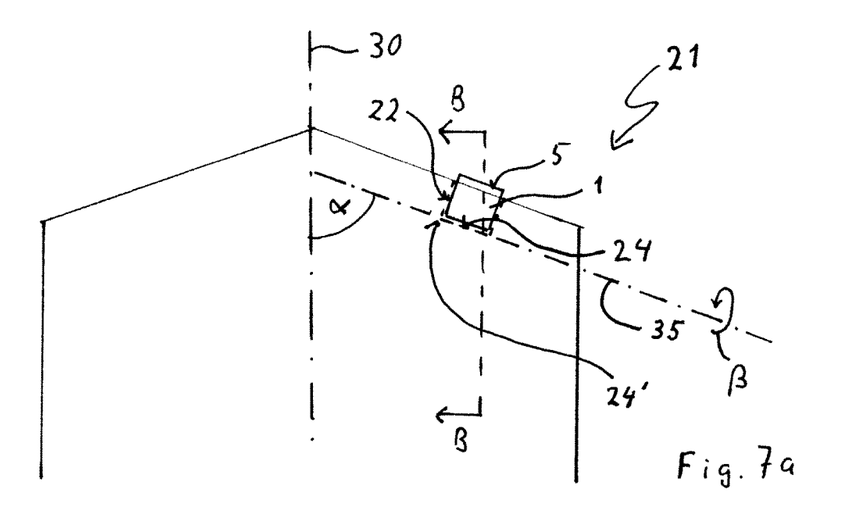
Figure 7B:
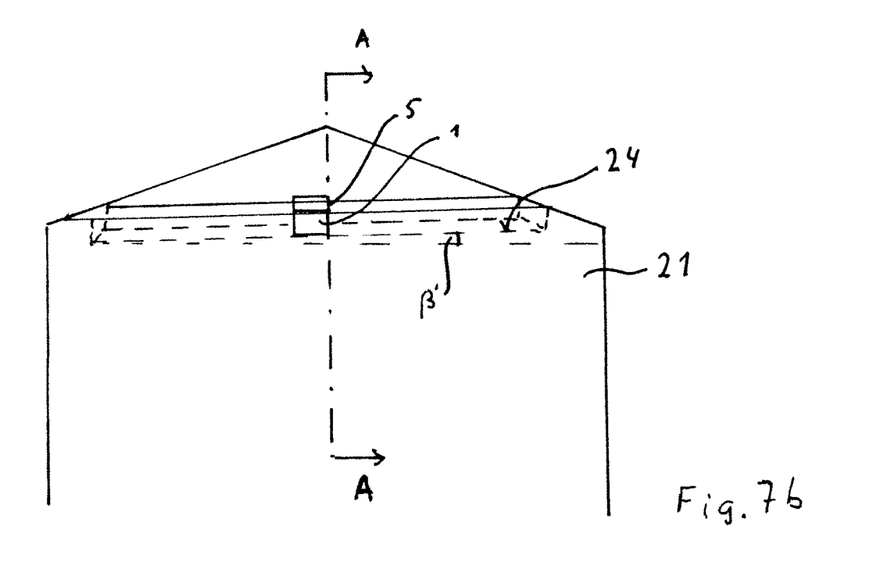

The cutting head 21 comprises three slots offset from the axis 30 and also offset from each other in the circumferential direction by about 120°, and having a straight plane base surface 24, each of which base surfaces 24 being inclined with respect to the axis 30 by the same angle $\alpha$, when measured in a plane E (FIG. 5b) including the axis 30 and simultaneously extending perpendicular to an edge 24' of said base surface 24 of the slot 22 (cf. FIG. 7a). The angle $\alpha$ may vary to a wide extend and corresponds to conical angle of a valve seat surface when measured with respect to the axis thereof, which may typically fall with in the range from 20 through 70 degrees. However, also other angles in the range from 5° through 90° are not excluded. A "conical" angle of 90° would correspond to a plane valve seat which may also be used in some cases. Further, the base surface 24 is also tilted with respect to a radial plane (perpendicular to the axis) about an angle $\beta'$. These inclination angles $\alpha$ and $\beta'$ of the base surface 24 are schematically shown in FIGS. 7a and 7b, wherein FIG. 7a corresponds a sectional view A-A in FIG. 7b and FIG. 7b corresponds a sectional view B-B in FIG. 7a. Precisely spoken, one may imagine the base surface 24 as a plane surface extending somewhat inclined to the plane of the paper once seen in the presentation according to FIG. 7a, wherein this plane is further slightly rotated by a relief angle $\beta$ about an axis 35 shown in FIG. 7a and defined by the line of intersection between the above defined axial plane and the base surface. When projected into the sectional plane of FIG. 7b, the resulting angle will be $\beta'$, which in general will be somewhat smaller than the angle $\beta$. Since the presentation of FIGS. 7a and 7b are only schematic illustrations of the angular orientation of the base surface 24, no further structures of the tool head 21 and also no hatching for surfaces shown in cross-section are shown.

Figure 6A:
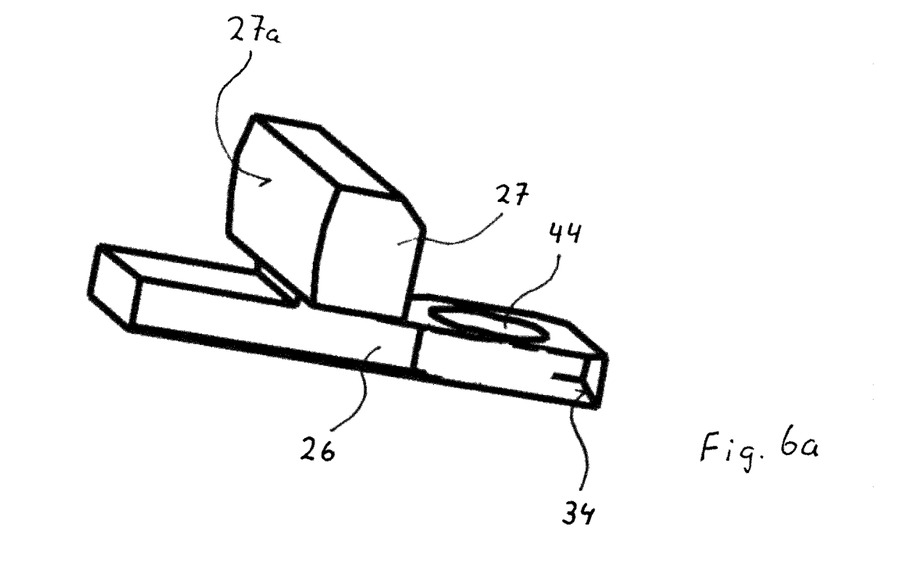
Figure 6B:
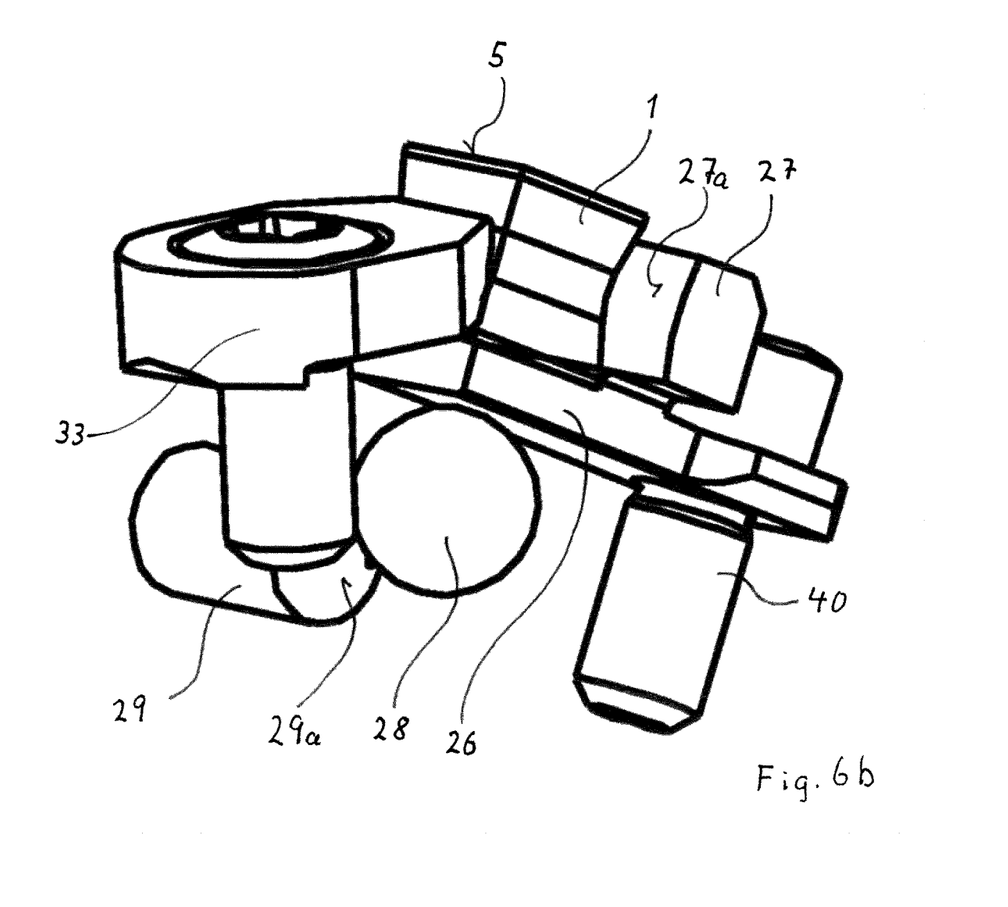

A clamping- and adjustment mechanism which is more clearly shown in FIGS. 6a and 6b, respectively, is arranged within the slot 22 and serves for fixing and positioning a cutting insert 1.

Figure 5B:
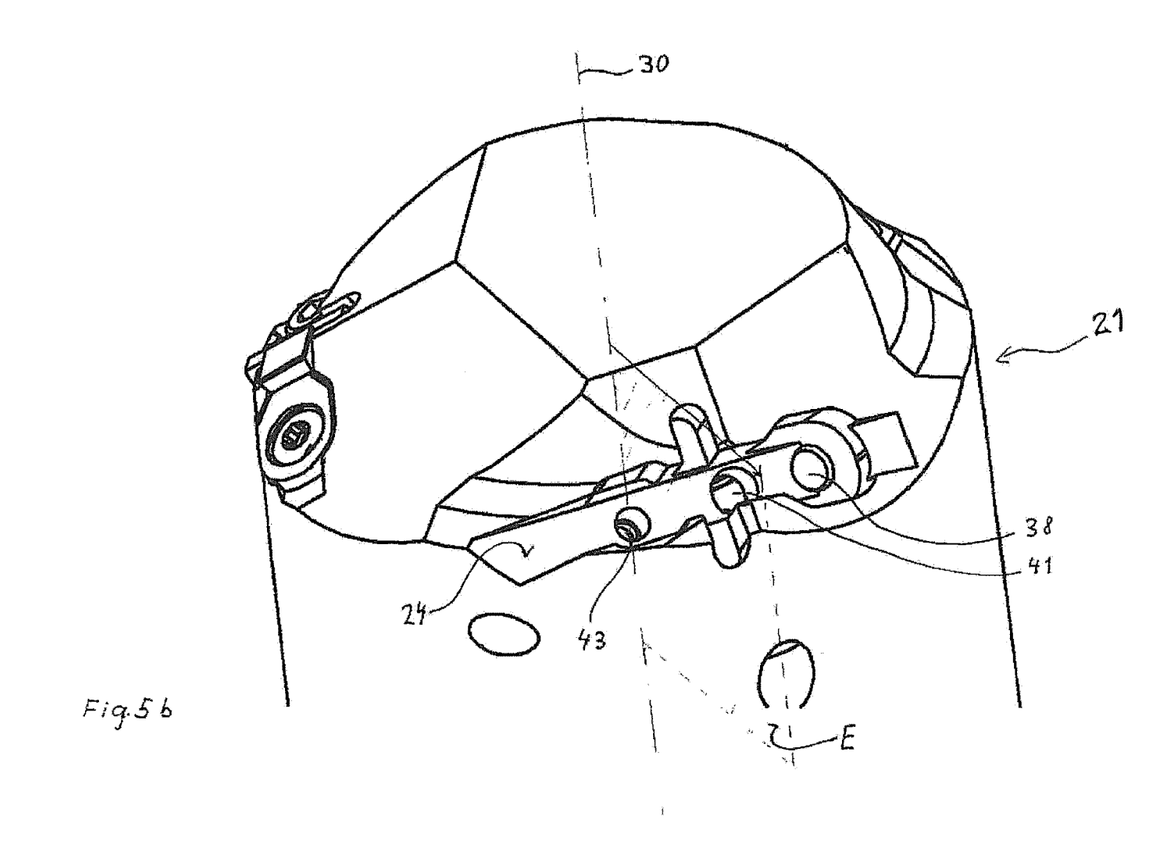
Figure 5C:
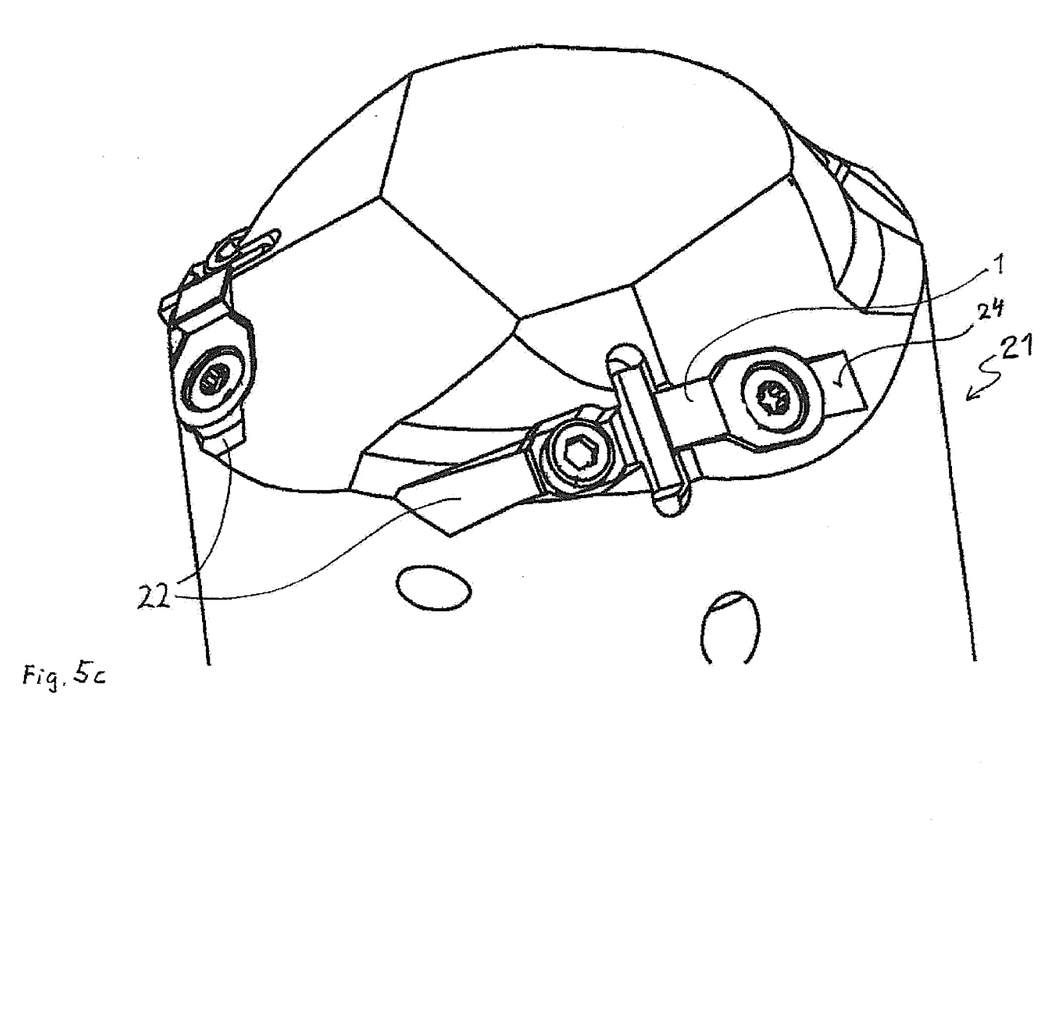

In order to better understand the arrangement and orientation of a corresponding cutting edge 5 of a cutting insert 1 within the slot 22, the clamping- and adjustment mechanism 25 as shown in FIGS. 6a and 6b will at first be discussed. The clamping. and adjustment mechanism 25 comprises an adjusting anvil or shim 26 having a stop member or anvil 27 integrally formed therewith. The rear end portion of the adjusting shim 26 is drawn in FIG. 6a as being transparent, in order to make the lower rear edge 34 of the adjusting shim 26 visible. The top and bottom surfaces 36, 37 of the adjusting shim 26 are ground as exactly parallel planes and the rear edge 34 when mounted extends parallel to the plane E (FIG. 5b). Accordingly, once a cutting insert 1 abutting with one of its side surfaces 4 on the stop member or anvil 27 and being supported by the top side 36 of the adjusting shim, said adjusting shim 26 may be tilted, even though to a limited extend, about the edge 34 serving as an axis, wherein the other end of the adjusting shim 26 is slightly raised. However, since the edge 34 is supported by the ground base surface 24 of the slot 22, a corresponding tilting of the adjusting shim only results in a prevotal movement of the cutting insert 1 about an axis extending parallel to the cutting edge, which means that the angular orientation of the cutting edge 5 is not changed thereby but instead the cutting edge is only moved along the radial and axial direction, more precisely perpendicular to and away from the base surface 24 Therefore, the cutting edge may be shifted to coincidence with the conical surface defined by another cutting edge 5 merely by tilting the adjusting shim about their rear edge 34. For that purpose, just a single adjustment screw 29 has to be adjusted as can be seen from FIG. 6b.

In FIG. 6b there is again shown the adjusting shim 26 which may be provisionally fixed by means of a fixing screw 40 engaging a bore 38. The bottom face 37 of the adjusting shim 26 is supported by the ground plane base surface 24 and is simultaneously in contact with an adjustment ball 28, being arranged within a bore 41 of the base surface 24. From FIG. 6b there may be seen that the conical tip 29a of adjustment screw 29 is in contact with adjustment ball 28 so that said ball 28 may be pressed upwardly against the bottom surface 37 by rotation of the adjustment screw 29, whereupon the adjusting shim 26 will be raised off from said surface 24 and tilted about its rear edge 34 supported on the surface 24. Raising of the surface 37 from the surface 24 may occur in the order of for instance one hundredth to one tenth of a millimeter so that it may be not be necessary to release the fixing screw 40.

Figure 6C:
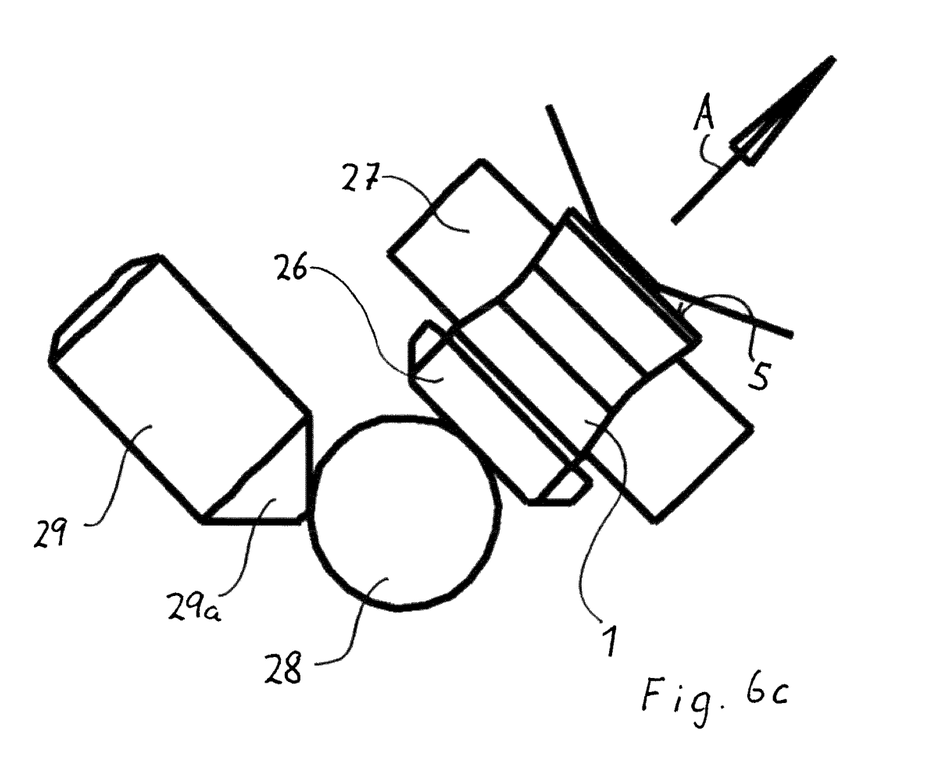

FIG. 6c again illustrates the adjustment principle of the present embodiment, according to which only a translation of the cutting edges 5 perpendicular to its longitudinal extension occurs without effecting the angular orientation thereof.

A clamp 42 presses a side face 4 of the cutting insert against the side face 27a of an anvil 27 and simultaneously against or towards the base face 13 such that the cutting insert and its respective active cutting edge 5 is exactly arranged and oriented with respect to the axis of the tool body.

The slot 22 comprises bores 38, 41, 43 in the ground base surface 24 for receiving fixing screws 39, 40 and an adjusting ball 28. Adjustment screw 29 is accessible by lateral bores 31 or 32 and allows to move the adjusting ball 28, on which a portion of the adjusting shim 26 is resting.

In contrast to the prior art, the cutting insert according to the present invention is not intended for regrinding and readjustment while instead worn our cutting edges are simply replaced by indexing or turning the cutting insert, whereupon one of the said top and bottom surfaces 2 and 3, respectively, is in each case serving as a supporting surface and correctly positioned and aligns the insert. A lateral support occurs by means of the side surfaces 4 and the clamping and adjustment mechanism 25. In this way, eight different cutting edges may be used one after another and get into engagement with the work piece, which causes much less efforts when compared to regrinding and readjustment of a common blade.

For the purpose of original shimlosure it is to be noted that any features which may be gathered by a skilled person from the present description, the drawings and the claims, even if only described in connection with particular further features, may be combined individually as well as in arbitrary combinations with any other of the features or groups of features shimlosed herein, unless this is explicitly excluded or technical conditions would render such combinations impossible or senseless. The comprehensive, explicit discussion of any combinations of features which might be thought of is dispensed with just for the sake of brevity and legibility of the description and claims.

The invention claimed is:

1. Rotatable tool for preparing rotational symmetrical surfaces and having a shaft which is mountable for rotation about an axis thereof, and a cutting head comprising at least one recess for receiving a cutting insert, a base surface of said recess being provided for supporting a bottom or top surface of a cutting insert and being tilted by an angle between 5° and 90° with respect to said axis,
    wherein the cutting insert comprises a cuboid body having a substantially square top face and a bottom face, said top face and bottom face being connected by means of four peripheral adjoining side surfaces,
    wherein at least two cutting edges are formed at the transition of the top face to at least two side surfaces, that cutting edges defining a plane of the top face,
    wherein the plane defined by the top face cutting edges has maximum dimensions of 6 mm×6 mm, the bottom face having a supporting surface which is formed exactly parallel to the plane defined by the top face cutting edges by means of grinding within a tolerance of less than 5 angular minutes, the top face and the bottom face each being formed as continuous planar surfaces,
    wherein the cutting edges of the top face and the bottom face are defining the shape of a cube within an edge length tolerance of 5%, and
    wherein said base surface of said recess, which is provided for the support of a respective non-active face of said top and bottom faces, respectively, is ground to a particular angle between 5° and 90° relative to said axis within a tolerance of less than 5 angular minutes.

2. Rotatable tool according to claim 1, wherein the top and the bottom face of the cutting insert are formed in a mirror shape and/or identical to each other, and wherein cutting edges of the cutting insert are also formed at the transition from the side surfaces to the bottom face.

3. Rotatable tool according to claim 1, wherein the top face and the bottom face of the cutting insert each are formed as continuous planar surfaces.

4. Rotatable tool according to claim 1, wherein a central portion of the top face and/or the bottom face of the cutting insert, said central portion remaining a distance of at least 0.5 mm with respect to the adjacent cutting edges and serving as a supporting surface which is parallel with respect to the plane by the cutting edges on the opposite side, is slightly projecting or recessed with respect to the plane defined by the cutting edges of the same side by a maximum of 0.5 mm.

5. Rotatable tool according to claim 1, wherein side surfaces of the cutting insert are recessed in that their portions adjoining the top face and the bottom face, respectively, are forming a wedge angle with the upper side and lower side, respectively, of less than 90°.

6. Rotatable tool according to claim 1, wherein the cross section of the cutting insert measured along a plane parallel to and between each of the top face and the bottom face, respectively, is smallest at a position where the plane is the same distance from each of the top face and the bottom face, respectively.

7. Rotatable tool according to claim 1, wherein the cross section, when measured parallel to the top face and the bottom face, is continuously decreasing when starting from each of top face or bottom face, respectively, towards an intermediate plane between said top face and bottom face.

8. Rotatable tool according to claim 1, wherein the body is comprised of cemented carbide, and wherein each of the top face and bottom face are coated with a layer of CBN.

9. Rotatable tool according to claim 1, wherein the thickness of the cutting insert defined by the distance between the top face and the bottom face corresponds to at least 95% and to at most 105% of the length of a cutting edge which intern defines the length of the cube defined by the cutting edges.

10. Rotatable tool according to claim 1, wherein the cutting edge is provided at each of the four square sides of the top face and the bottom face, respectively.

11. Rotatable tool according to claim 1, wherein a plurality of recesses is provided, each having the shape of a slot extending on a forward oriented portion of the cutting head offset from said axis.

12. Rotatable tool according to claim 11, wherein the base surfaces of said slots are each ground to the same angle with respect to the axis.

13. Rotatable tool according to claim 12, wherein the intersection lines of the base surfaces of the recesses, with planes including the axis and extending perpendicular to a lateral edge of the base surface of a respective slot, are located on a common conical surface.

14. Rotatable tool according to claim 12, wherein the tool comprises an adjustment mechanism having an adjusting shim, which adjustment mechanism is at least partly arranged within said at least one recess,
    wherein said adjusting shim may be arranged between the bottom face of the cutting insert and said base surface and which is pivotable about an axis falling within the base surface and extending parallel to the plane including the axis and extending perpendicular to a lateral edge of the base surface of said slot, and
    wherein the intersection lines of the base surfaces of the recesses, with planes including the axis and extending perpendicular to a lateral edge of the base surface of a respective slot, are located on a common conical surface.

15. Rotatable tool according to claim 11, wherein the base surfaces of said slots are each ground to a different angle with respect to the axis.

16. Rotatable tool according to claim 13, wherein the intersection lines of the base surfaces of the recesses, with planes including the axis and extending perpendicular to a lateral edge of the base surface of a respective slot, are each located on a different conical surface, each said conical surfaces intersecting or adjoining at least one of the other conical surfaces.

17. Rotatable tool according to claim 13, wherein the tool comprises an adjustment mechanism having an adjusting shim, which adjustment mechanism is at least partly arranged within said at least one recess,
wherein said adjusting shim may be arranged between the bottom face of the cutting insert and said base surface and which is pivotable about an axis falling within the base surface and extending parallel to the plane including the axis and extending perpendicular to a lateral edge of the base surface of said slot, and
wherein the intersection lines of the base surfaces of the recesses, with planes including the axis and extending perpendicular to a lateral edge of the base surface of a respective slot, are each located on a different conical surface, each said conical surfaces intersecting or adjoining at least one of the other conical surfaces.

18. Rotatable tool according to claim 1, wherein the tool comprises an adjustment mechanism having an adjusting shim, which adjustment mechanism is at least partly arranged within said at least one recess, and
wherein said adjusting shim may be arranged between the bottom face of the cutting insert and said base surface and which is pivotable about an axis falling within the base surface and extending parallel to the plane including the axis and extending perpendicular to a lateral edge of the base surface of said slot.

* * * * *